United States Patent
Currivan et al.

(10) Patent No.: US 9,203,664 B2
(45) Date of Patent: Dec. 1, 2015

(54) MEASUREMENT OF INTERMODULATION PRODUCTS OF DIGITAL SIGNALS

(71) Applicant: BROADCOM CORPORATION, Irvine, CA (US)

(72) Inventors: Bruce J. Currivan, Los Altos, CA (US); Thomas J. Kolze, Phoenix, AZ (US)

(73) Assignee: BROADCOM CORPORATION, Irvine, CA (US)

( * ) Notice: Subject to any disclaimer, the term of this patent is extended or adjusted under 35 U.S.C. 154(b) by 183 days.

(21) Appl. No.: 13/774,861

(22) Filed: Feb. 22, 2013

(65) Prior Publication Data

US 2013/0215953 A1 Aug. 22, 2013

Related U.S. Application Data

(60) Provisional application No. 61/602,015, filed on Feb. 22, 2012.

(51) Int. Cl.
*H04L 27/01* (2006.01)
*H04L 27/38* (2006.01)

(52) U.S. Cl.
CPC ............. *H04L 27/01* (2013.01); *H04L 27/38* (2013.01)

(58) Field of Classification Search
CPC ...... H04B 1/123; H04B 17/20; H04B 1/0003; H04B 1/001; H04B 1/0475; H04L 27/01; H04L 27/38
USPC .................. 375/232, 343, 346, 350
See application file for complete search history.

(56) References Cited

U.S. PATENT DOCUMENTS

| | | | |
|---|---|---|---|
| 7,876,867 B2* | 1/2011 | Filipovic et al. | 375/346 |
| 2002/0094785 A1* | 7/2002 | Deats | 455/67.3 |
| 2002/0187761 A1* | 12/2002 | Im et al. | 455/126 |
| 2007/0263754 A1* | 11/2007 | Currivan et al. | 375/349 |
| 2009/0075612 A1* | 3/2009 | Keehr et al. | 455/226.1 |
| 2011/0133830 A1* | 6/2011 | Huyart et al. | 329/304 |

* cited by examiner

*Primary Examiner* — Michael Neff
*Assistant Examiner* — David S Huang
(74) *Attorney, Agent, or Firm* — Garlick & Markison; Shayne X. Short

(57) ABSTRACT

Measurement of intermodulation products of digital signals. One or more devices, within a communication system, having and analog to digital converter (ADC) with a sufficiently wide frequency response as to capture not only a signal of interest, but many other signals simultaneously, allows for appropriate signal processing of such captured samples to identify one or more intermodulation products that may exist as a function of the relationship of one or more frequencies. For example, composite second order (CSO) or composite triple beat (CTB), or even higher ordered signals, may occur within various communication systems. These effects may be caused by any of a number of sources including nonlinearities in the system, such as affects associated with laser clipping, amplifier compression, corroded connectors, etc. Appropriate processing is performed determine the existences of such intermodulation product signals, and, if desired, subsequent signal processing and/or fixing of such effects therein is performed.

20 Claims, 15 Drawing Sheets

US 9,203,664 B2

MEASUREMENT OF INTERMODULATION PRODUCTS OF DIGITAL SIGNALS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 61/602,015 entitled "Measurement of intermodulation products of digital signals," Feb. 22, 2012.

Incorporation by Reference

The following U.S. Utility Patent Applications/U.S. Patents are hereby incorporated herein by reference in their entirety and made part of the present U.S. Utility Patent Application for all purposes:

1. U.S. Utility patent application Ser. No. 12/078,923 entitled "Adaptive Equalization and Interference Cancellation with Time-Varying Noise and/or Interference," filed Apr. 8, 2008, now U.S. Pat. No. 8,180,001 B2, issued on May 15, 2012, which claims priority pursuant to 35 U.S.C. §119(e) to the following U.S. Provisional Patent Application which is hereby incorporated herein by reference in its entirety and made part of the present U.S. Utility Patent Application for all purposes:

1.1. U.S. Provisional Patent Application Ser. No. 60/960, 868, filed Dec. 17, 2007.

2. U.S. Utility patent application Ser. No. 13/451,199 entitled "Adaptive Equalization and Interference Cancellation with Time-Varying Noise and/or Interference," filed Apr. 19, 2012, pending.

3. U.S. Utility patent application Ser. No. 13/228,301 entitled "Digital correction techniques for data converters," filed Sep. 8, 2011, pending, which claims priority pursuant to 35 U.S.C. §119(e) to the following U.S. Provisional Patent Applications which are hereby incorporated herein by reference in its entirety and made part of the present U.S. Utility Patent Application for all purposes:

3.1. U.S. Provisional Patent Application Ser. No. 61/380, 801, filed Sep. 8, 2010.

3.1. U.S. Provisional Patent Application Ser. No. 61/449, 949, filed Mar. 7, 2011.

4. U.S. Utility patent application Ser. No. 13/174,467 entitled "Compensating for unwanted interference in a communications receiver," filed Jun. 30, 2011, pending, which claims priority pursuant to 35 U.S.C. §119(e) to the following U.S. Provisional Patent Application which is hereby incorporated herein by reference in its entirety and made part of the present U.S. Utility Patent Application for all purposes:

4.1. U.S. Provisional Patent Application Ser. No. 61/388, 294, filed Sep. 30, 2010.

BACKGROUND OF THE INVENTION

1. Technical Field of the Invention

The invention relates generally to communication systems; and, more particularly, it relates to identification, analysis, and/or diagnostics of at least one operational characteristic within a communication system.

2. Description of Related Art

Data communication systems have been under continual development for many years. With respect to certain types of communication systems, various forms of interference may unfortunately deleteriously affect the operation of various communication links, verification devices, components, connectors, etc. therein. For example, the greater the complexity and number of devices within a communication system, and particularly if multiple respective signals are communicated therein at different respective frequencies, there interaction of these various signals at various frequencies may unfortunately degrade the performance of one or more elements within the communication system. The present art does not provide an adequate means for the mitigation of any such related deleterious effects.

DETAILED DESCRIPTION OF THE INVENTION

Figure 1:
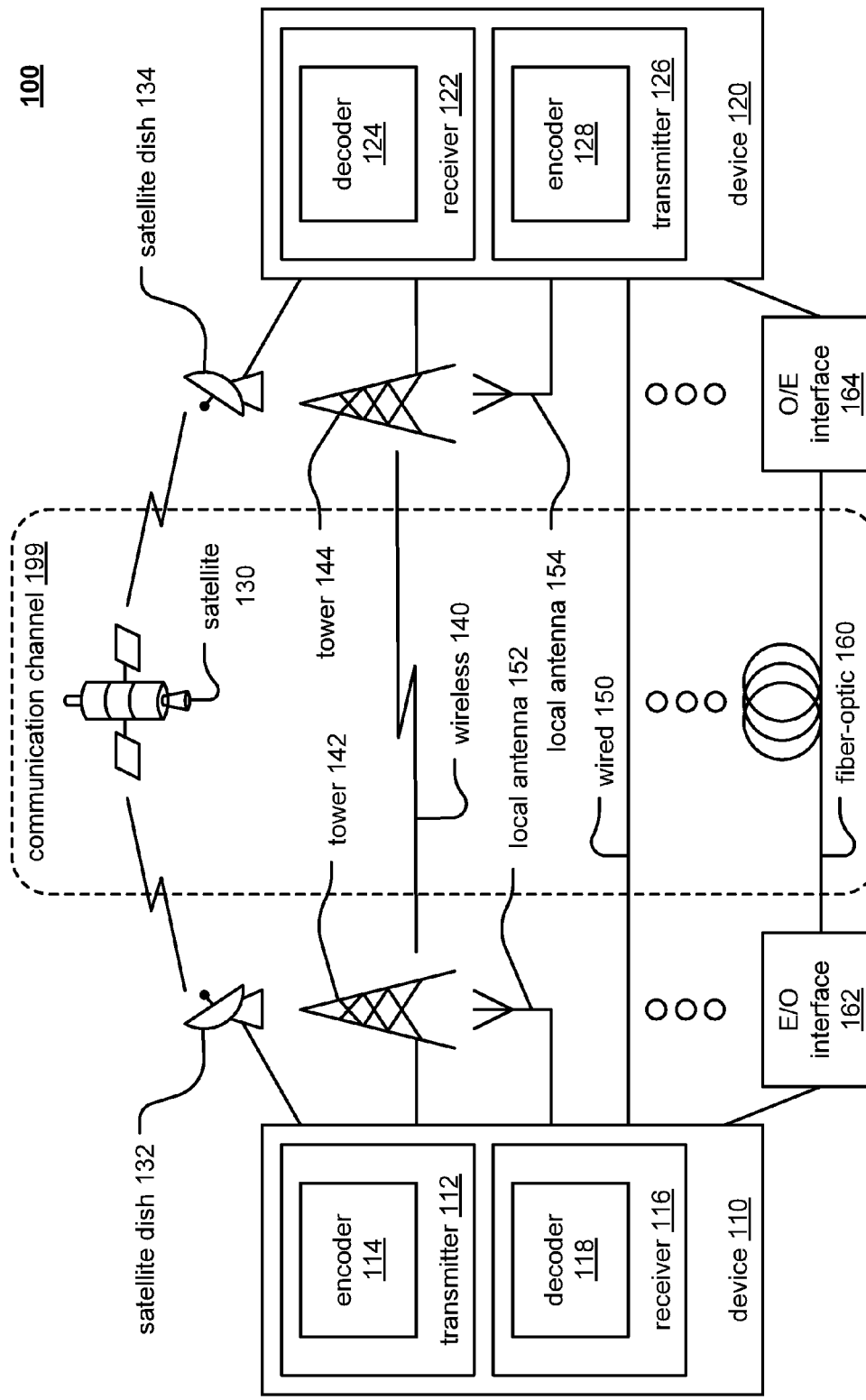
FIG. 1, FIG. 2, and FIG. 3 illustrate various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
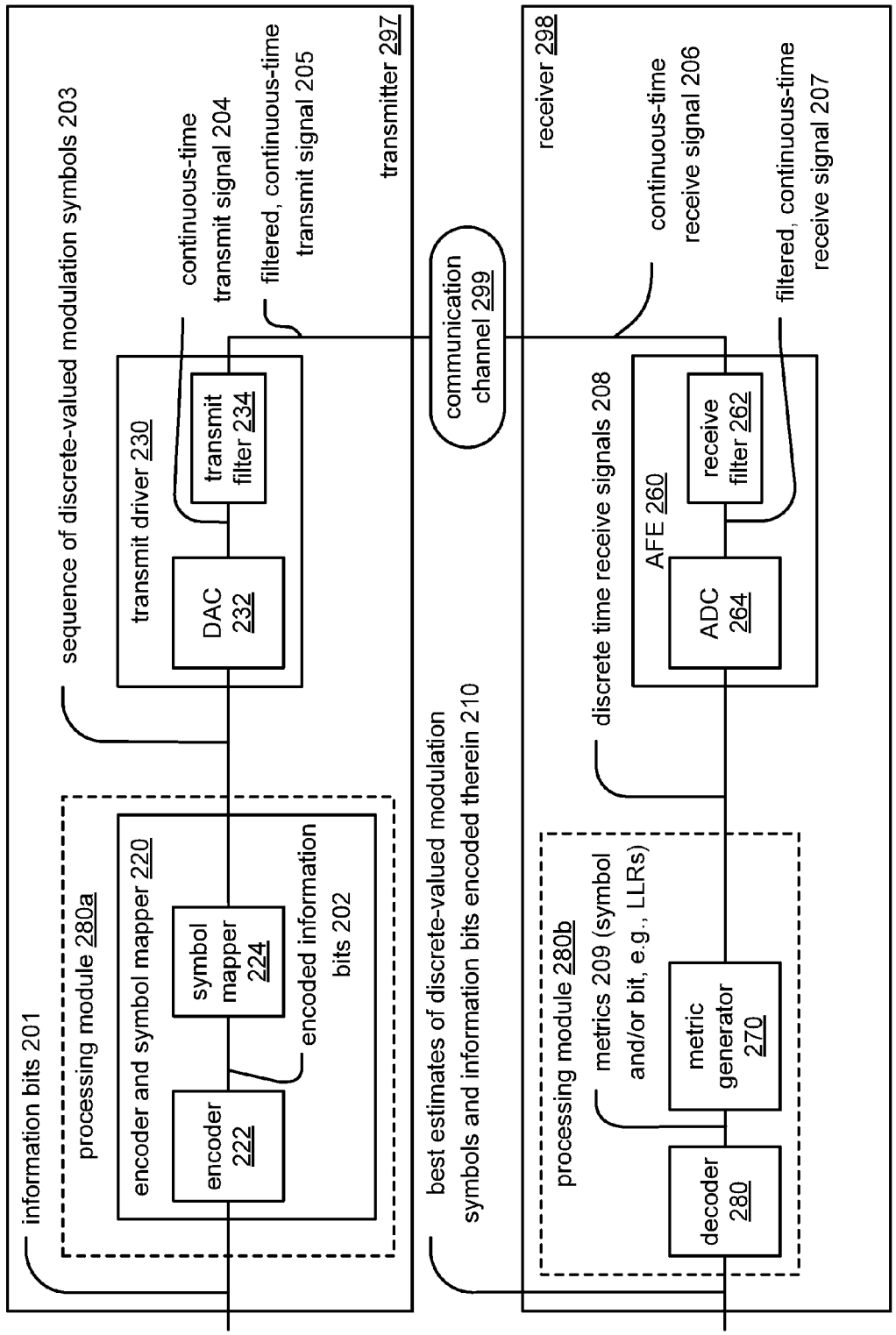

FIG. 1 and FIG. 2 are diagrams illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (0/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Figure 3:
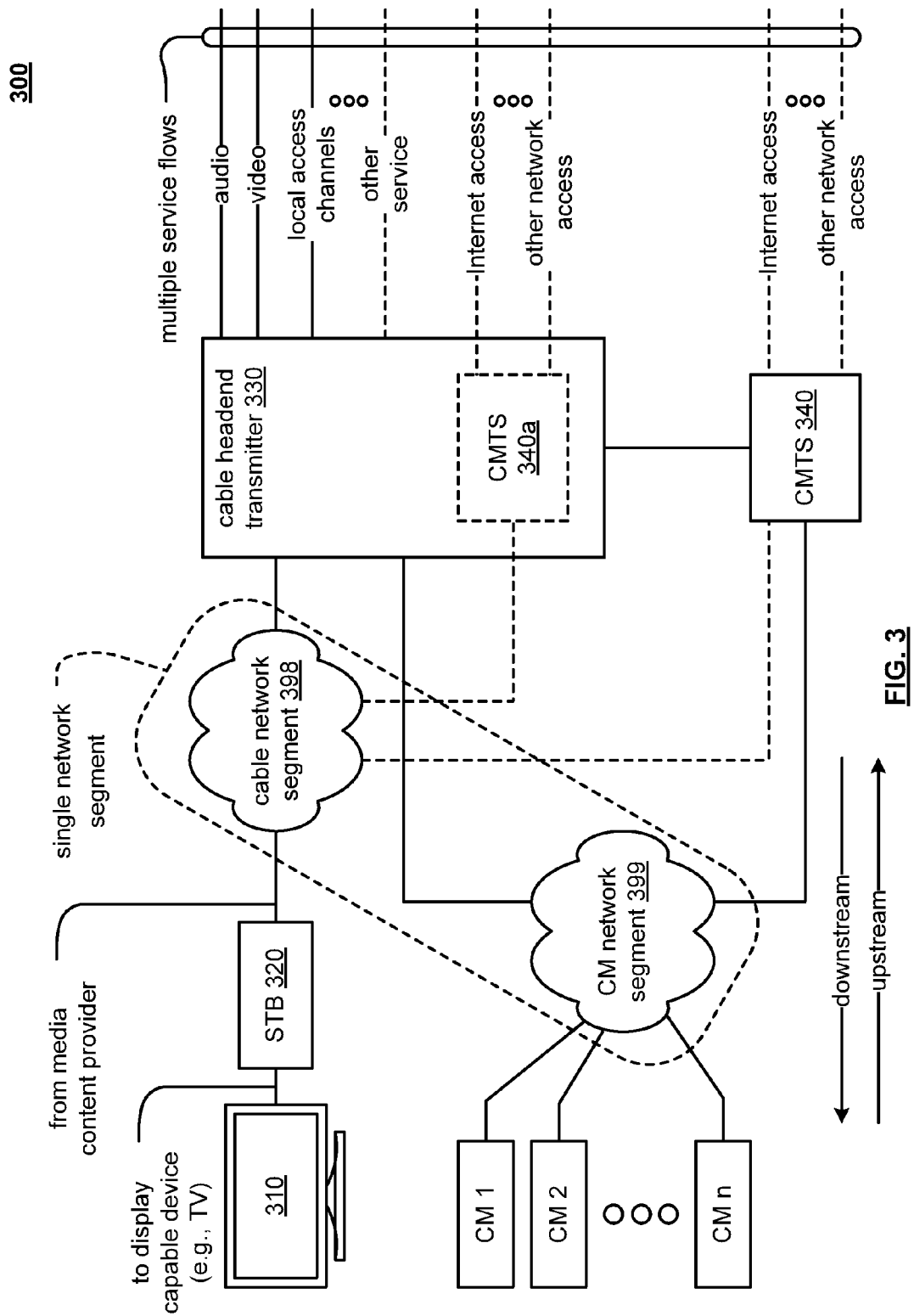

Referring to the communication system 300 of FIG. 3, this communication system 300 may be viewed particularly as being a cable system. Such a cable system may generally be referred to as a cable plant and may be implemented, at least in part, as a hybrid fiber-coaxial (HFC) network (e.g., including various wired and/or optical fiber communication segments, light sources, light or photo detection complements, etc.). For example, the communication system 300 includes a number of cable modems (shown as CM 1, CM 2, and up to CM n). A cable modem network segment 399 couples the cable modems to a cable modem termination system (CMTS) (shown as 340 or 340a and as described below).

A CMTS 340 or 340a is a component that exchanges digital signals with cable modems on the cable modem network segment 399. Each of the cable modems coupled to the cable modem network segment 399, and a number of elements may be included within the cable modem network segment 399. For example, routers, splitters, couplers, relays, and amplifiers may be contained within the cable modem network segment 399.

The cable modem network segment 399 allows communicative coupling between a cable modem (e.g., a user) and the cable headend transmitter 330 and/or CMTS 340 or 340a. Again, in some embodiments, a CMTS 340a is in fact contained within a cable headend transmitter 330. In other embodiments, the CMTS is located externally with respect to the cable headend transmitter 330 (e.g., as shown by CMTS 340). For example, the CMTS 340 may be located externally to the cable headend transmitter 330. In alternative embodiments, a CMTS 340a may be located within the cable headend transmitter 330. The CMTS 340 or 340a may be located at a local office of a cable television company or at another location within a cable system. In the following description, a CMTS 340 is used for illustration; yet, the same functionality and capability as described for the CMTS 340 may equally apply to embodiments that alternatively employ the CMTS 340a. The cable headend transmitter 330 is able to provide a number of services including those of audio, video, local access channels, as well as any other service of cable systems. Each of these services may be provided to the one or more cable modems (e.g., CM 1, CM 2, etc.). In addition, it is noted that the cable headend transmitter 330 may provide any of these various cable services via cable network segment 398 to a set top box (STB) 320, which itself may be coupled to a television 310 (or other video or audio output device). While the STB 320 receives information/services from the cable headend transmitter 330, the STB 320 functionality may also support bi-directional communication, in that, the STB 320 may independently (or in response to a user's request) communicate back to the cable headend transmitter 330 and/or further upstream.

In addition, through the CMTS 340, the cable modems are able to transmit and receive data from the Internet and/or any other network (e.g., a wide area network (WAN), internal network, etc.) to which the CMTS 340 is communicatively coupled. The operation of a CMTS, at the cable-provider's head-end, may be viewed as providing analogous functions provided by a digital subscriber line access multiplexor (DSLAM) within a digital subscriber line (DSL) system. The CMTS 340 takes the traffic coming in from a group of customers on a single channel and routes it to an Internet Service Provider (ISP) for connection to the Internet, as shown via the Internet access. At the head-end, the cable providers will have, or lease space for a third-party ISP to have, servers for accounting and logging, dynamic host configuration protocol (DHCP) for assigning and administering the Internet protocol (IP) addresses of all the cable system's users (e.g., CM 1, CM2, etc.), and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (EuroDOCSIS), the major standard used by European cable systems in providing Internet access to users, without departing from the scope and spirit of the invention.

The downstream information flows to all of the connected cable modems (e.g., CM 1, CM2, etc.). The individual network connection, within the cable modem network segment 399, decides whether a particular block of data is intended for it or not. On the upstream side, information is sent from the cable modems to the CMTS 340; on this upstream transmission, the users within the group of cable modems to whom the data is not intended do not see that data at all. As an example of the capabilities provided by a CMTS, a CMTS will enable as many as 1,000 users to connect to the Internet through a single 6 Mega-Hertz channel. Since a single channel is capable of 30-40 Mega-bits per second of total throughput (e.g., currently in the DOCSIS standard, but with higher rates envisioned such as those sought after in accordance with the developing DVB-C2 (Digital Video Broadcasting—Second Generation Cable) standard, DVB-T2 (Digital Video Broadcasting—Second Generation Terrestrial) standard, etc.), this means that users may see far better performance than is available with standard dial-up modems.

Moreover, it is noted that the cable network segment 398 and the cable modem network segment 399 may actually be the very same network segment in certain embodiments. In other words, the cable network segment 398 and the cable modem network segment 399 need not be two separate network segments, but they may simply be one single network segment that provides connectivity to both STBs and/or cable modems. In addition, the CMTS 340 or 340a may also be coupled to the cable network segment 398, as the STB 320 may itself include cable modem functionality therein.

It is also noted that any one of the cable modems $1, 2, \ldots m\ n$, the cable headend transmitter 330, the CMTS 340 or 340a, the television 310, the STB 320, and/or any device existent within the cable network segments 398 or 399, may include a memory optimization module as described herein to assist in the configuration of various modules and operation in accordance with any one of a plurality of protocols therein.

Various communication devices can operate by employing an equalizer therein (e.g., an adaptive equalizer). Some examples of such communication devices include those described herein, including cable modems (CMs). However, it is noted that various aspects and principles presented herein may be generally applied to any type of communication device located within any of a variety of types of communication systems. For example, while some illustrative and exemplary embodiments herein employ the use of a CM in particular, though it is noted that such aspects and principles presented herein may be generally applied to any type of communication device located within any of a variety of types of communication systems.

Various communication devices (e.g., a cable modem (CM), a cable modem termination system (CMTS), etc.) may report information there between and coordinate operation thereof.

It is again noted that while the particular illustrative example of a cable modem (CM) is employed in a number of different embodiments, diagrams, etc. herein, such architectures, functionality, and/or operations may generally be included and/or performed within any of a number of various types of communication devices including those operative in accordance with the various communication system types, including those having more than one communication medium type therein, such as described with reference to FIG. 1.

Within various types of communication systems, including those that have at least some segments of wired and/or optical fiber components (e.g., such as within a hybrid fiber-coaxial (HFC) network), certain components therein may operate non-linearly. That is to say, there may be certain complements within such communication systems that generate various non-linear effects. For example, clipping, such as from certain light sources (e.g., lasers, laser diodes, light emitting diodes, etc.) within an HFC network, may introduce certain non-linearities in regards to the signals output there from and generated thereby. Other components within such communication systems may also be sources of such non-linearities. For example, amplifiers implemented within such communication systems may generate certain non-linear effects including compression. Also, respective connectors, such as between various coaxial communication links and/or segments within an overall cable plant, may introduce certain non-linear effects (e.g., such as which may be associated with corrosion [e.g., calcifications] or other types of buildups on such respective connectors). Such corroded connectors within such a communication system may operate as mild diodes thereby introducing various non-linear effects Moreover, within digitally implemented communication systems, in which the signaling is implemented digitally (e.g., such as in accordance with quadrature amplitude modulation (QAM) signaling including generally signals having a rectangular leaf shaped magnitude as a function of frequency spectrum with some degree of rolloff) the effects of such non-linearities, which may be different than within prior communication systems in which all or most signaling therein was implemented in the analog domain. For example, such non-linearities may occur in quadratic form, cubic form, or in accordance with even higher orders, will result in distortion products whose spectra are themselves spread in frequency. Generally, considering an input signal of x, the resultant signal y may be viewed as including any of a number of higher order intermodulation products therein. For example, the resultant signal y may be described as follows as a function of x.

$y=a_1 \times x + a_2 \times x^2 + a_3 \times x^3 + a_4 \times x^4 + a_5 \times x^5 +$ and possibly any higher order terms.

The coefficients $a_1$, $a_2$, and so on may take on any of a number of desired values. In some embodiments, these respective coefficients associated with a higher order terms (e.g., $a_2$ and higher) will be relatively small (e.g., $10^{-2}$, $10^{-3}$, $10^{-4}$, $10^{-5}$, etc.) in comparison to the coefficient of the fundamental (e.g., fundamental frequency).

Generally speaking, considering one such component which may be implemented within a communication system, and amplifier, the transfer function thereof (if perfect and ideal) simply be as follows:

$y=x.$

However, as described above, certain clipping may unfortunately occur within real life and non-ideal components. Such clipping may occur symmetrically in certain components, and such clipping may occur asymmetrically and other components (e.g., such as in accordance with light sources such as lasers). In accordance with such asymmetrical clipping, the respective values at which clipping occurs in two or more respective directions (e.g. in the positive and negative directions) are different, while in accordance with symmetrical clipping, the respective values at which clipping occurs in the two or more respective directions are the same at least in terms of absolute value. Moreover, in accordance with modeling such intermodulation products, alternative expressions besides the polynomial shown above may alternatively be used (e.g., the hyperbolic tangent function, tanh, and/or other mathematical functions) without departing from the scope and spirit of the invention.

Figure 4:
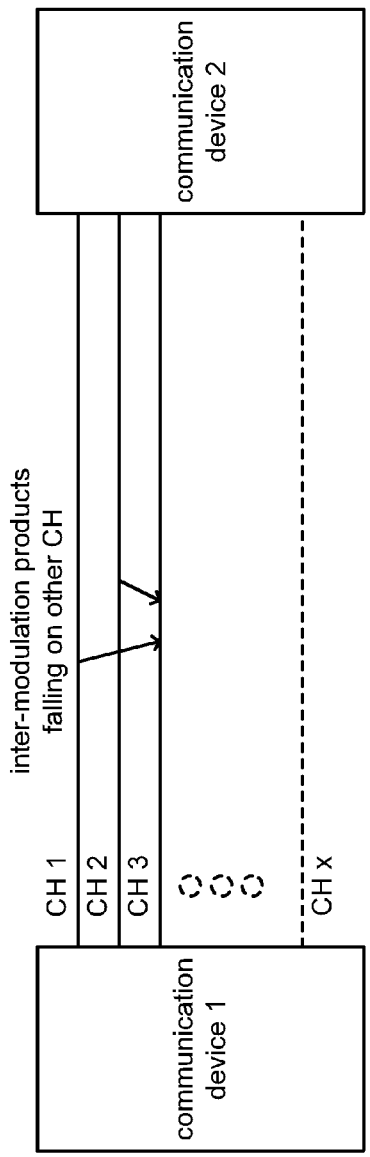
FIG. 4 illustrates an embodiment of intermodulation products of digital signals.

FIG. 4 illustrates an embodiment 400 of intermodulation products of digital signals. Generally, in accordance with various aspects, and their equivalents, of the invention, estimation of these respective coefficients $a_1$, $a_2$, and so on is made. Again, the respective coefficients associated with a higher order terms (e.g., $a_2$ and higher) will be relatively small (e.g., $10^{-2}$, $10^{-3}$, $10^{-4}$, $10^{-5}$, etc.).

As may be seen with respect to this diagram, to respective communication devices are shown as being in communication with one another via a plurality of communication channels. Generally speaking, any number of communication channels may be included (e.g., including hundreds of respective communication channels in some embodiments). For ease of illustration for the reader, many of the respective embodiments herein are directed towards showing the intermodulation effects incurred on one given channel as caused by two other respective channels. For example, in many of the illustrations herein, three respective channels are employed. However, it is again noted that such intermodulation products may be generated on any given channel using any of a number of other respective channels.

In accordance with such operations, estimation and/or measurement of such non-linear distortion may be made within a given communication device. Considering a communication system embodiment such as a cable plant or cable system, such estimation in or measurement of such non-linear distortion may be made within a cable modem. For example, while any of a number of different types of instrumentation and test equipment may be used to measure such distortion within such a communication system, the already provisioned and implemented cable modems within the system itself may be operative as a receiver and/or analyzer. One type of non-linear distortion which may be estimated and/or measured by such communication devices (e.g., cable modems) correspond to second and third order products, including composite second order (CSO) and/or composite triple beat (CTB) or even higher ordered intermodulation products of digital signals. Again, such non-linearities within various communication systems may come from a number of different sources (e.g., clipping within lasers, amplifier compression, corroded connectors acting as mild diodes, and/or any other non-linear source, etc.). Appropriate processing is performed to measure or identify whether or not such intermodulation product signals our existent, and, if desired, appropriate identification of such effects may assist in subsequent signal processing and/or fixing of such effects therein.

Again, as may be understood when comparing traditional primarily analog based communication systems with predominantly digital (e.g., QAM) communication systems, the CSO-CTB intermodulation products may unfortunately be hidden under the desired signals and may not be easily measured using certain types of test equipment (e.g., spectrum analyzers, etc.). In such traditional and legacy analog based communication systems, the video carrier signals could easily be analyze on a spectrum analyzer. However, this is not the case within with predominantly digital (e.g., QAM) communication systems, in which the distortion components are spread in spectrum as mentioned earlier. Herein, various means and/or approaches are presented by which the identification as well as the estimation and/or measurement of such non-linear distortion associated with such intermodulation products may be made within with predominantly digital (e.g., QAM) communication systems.

As mentioned above, a communication device implemented within the cable plant (e.g., a cable modem) may be configured and operative to measure, estimate, characterized, etc. CSO and CTB, among other intermodulation products, locally and independently. That is to say, such a communication device implemented within the cable plant (e.g., cable modem) may itself be implemented to perform such operations without requiring any necessary communication with a head-end transmitter, a CMTS, etc. Also, such operations may be implemented within such a communication device (e.g., cable modem) without requiring wideband capture or synchronization between a head-end transmitter, a CMTS, etc. and that particular communication device (e.g., cable modem).

It is again noted that while many of the illustrative embodiments and examples presented here and concentrate on CSO and/or CTB (e.g., CTB being a relatively common, third order non-linearity), such functionality, processing, operations, etc. may generally be applied to any desired type of non-linearities as may be incurred or experienced within such a communication system. Also, it is again noted that many of the exemplary embodiments presented herein employs three respective channels for ease of illustration to the reader, it is of course noted that such applicable at the may be made for systems including many more than three respective channels such that intermodulation products may be incurred on any given channel within the system.

Considering the exemplary embodiment of three respective communication channels (e.g., considering two of the respective narrowband channels at respective center frequencies of f1 and f2, respectively), and where the frequency or frequencies being incurred at the third communication channel may be any one or more of $f3=2\times f1-f2$, $f3=2\times f2-f1$, $f3=3\times f1$, $f3=3\times f2$, etc., measurement and capture of samples associated with these three respective communication channels may be made simultaneously. For example, such measurement may be made by capturing and comparing samples associated with these three respective communication channels to get CTB. Generally speaking, any such intermodulation products signal may correspond to any desired linear combination of one or more respective frequencies.

In such an exemplary embodiment, f1 and f2 may be viewed as being the center frequencies of two desired QAM communication channels A and B, respectively, and f3 may be viewed as being a third respective channel wherein intermodulation product may be incurred.

In certain alternative embodiments, a remotely implemented communication device (e.g., head-end transmitter or CMTS implemented within a cable plant) could intentionally increase the respective powers associated with the communication channels A and B to cause stronger and more readily measured CTB. Alternatively, relatively large and already existing A and B communication channels could be selected and a relatively smaller or empty C communication channel could be selected so that the CTB effect could be more readily ascertained and characterized. As may be understood, such careful selection of the respective channel powers associated with different respective communication channels between respective communication devices may be used to facilitate easier measurement of such intermodulation products.

In operation, the locally implemented communication device (e.g., cable modem) may select a plurality of respective communication channels on which samples are to be captured. In an alternative embodiment, a remotely implemented communication device (e.g., head-end transmitter or CMTS implemented within a cable plant) could inform the locally implemented communication device (e.g., cable modem) of a plurality of respective communication channels on which samples are to be captured. For example, such a remotely implemented communication device may have certain information regarding the location or locations on which certain intermodulation products may occur, and as such, such a remotely implemented communication device may be operative to select which particular communication channels are to be monitored. Regardless of the particular implementation in which selection of the communication channels of interest are made, a plurality of respective communication channels are sampled (e.g., considering a three channel embodiment, channels A and B are casting a measurable intermodulation product onto channel C—such as channels A and B casting a measurable third order intermodulation product, such as CTB, onto channel C).

The locally implemented communication device (e.g., cable modem) is implemented to capture samples simultaneously from the plurality of respective communication channels (e.g., channels A, B, and C). Certain digital signal processing may be performed on these captured samples from the plurality respective communication channels. In some embodiments, such processing is performed within the locally implemented communication device (e.g., cable modem); in other embodiments, such processing is performed within another device or communication device that is in communication with the locally implemented communication device (e.g., cable modem) [e.g., such samples are provided from the locally implemented communication device to another device or communication device that performs such digital processing].

With respect to such digital processing of these respective samples, any of a number of different means may be performed to assist in the identification of such intermodulation products. For example, in one embodiment, such digital signal processing may be implemented in accordance with correlation processing between communication channel C and communication channel $A^2 \times$ communication channel B. That is to say, the respective samples associated with C may be compared with those samples associated with $A^2 \times B$. Such correlation processing operations, among others, may be made to measure such intermodulation products (e.g., third order intermodulation products) falling onto communication channel C.

In an alternative embodiment, CSO and CTB measurement may be made by injecting a number of continuous wave (CW) tones (e.g., one, two, or more) at a remotely implemented communication device (e.g., head-end transmitter or CMTS implemented within a cable plant), and a locally implemented communication device (e.g., cable modem) may then perform appropriate processing seeking to identify certain intermodulation product tones (e.g., second and/or third order tones) in a fast Fourier transform (FFT) spectrum associated with signaling received at the locally implemented communication device (e.g., cable modem).

In even another embodiment, a remotely implemented communication device (e.g., head-end transmitter or CMTS implemented within a cable plant) may broadcast a pilot channel with known, or partially known, data or no data (empty channel). In certain embodiments, a pseudorandom noise (PRN) sequence may be used to spread the respective pilot tones broadcast on the pilot channel, such that all of the respective pilot tones are spread by the same synchronized PRN sequence. Using such a broadcast pilot tone implementation could further increase the accuracy of the digital signal processing identification that is used to detect such intermodulation products (e.g., CSO and/or CTB, and/or any other higher order intermodulation products) sees.

In yet another embodiment, utilization may be made with respect to the "extra dimensions" in the rolloff regions of existing communication channels. That is to say, such rolloff regions within existing communication channels will generally be relatively free of desired signals, but certain intermodulation products (e.g., CTB products) may nonetheless be incurred on the rolloff bands. As such, the rolloff bands may be used to measure such intermodulation products (e.g., CTB products).

With respect to certain of the following diagrams, simulation and analysis of such intermodulation products is presented. An exemplary signal consisting of two narrowband QAM signals is simulated to represent two desired communication channels A and B, with respective center frequencies $f1=200$ MHz and $f2=270$ MHz, respectively, each with symbol rate of $fb=5.36$ MHz. The respective simulation presented herein uses a sample rate, $fs=512\times fb=2.744$ GHz. the aggregate signal is passed through a third order non-linearity thereby generating the associated intermodulation products and giving the output shown in the spectral plot associated with FIG. 5.

Figure 5:
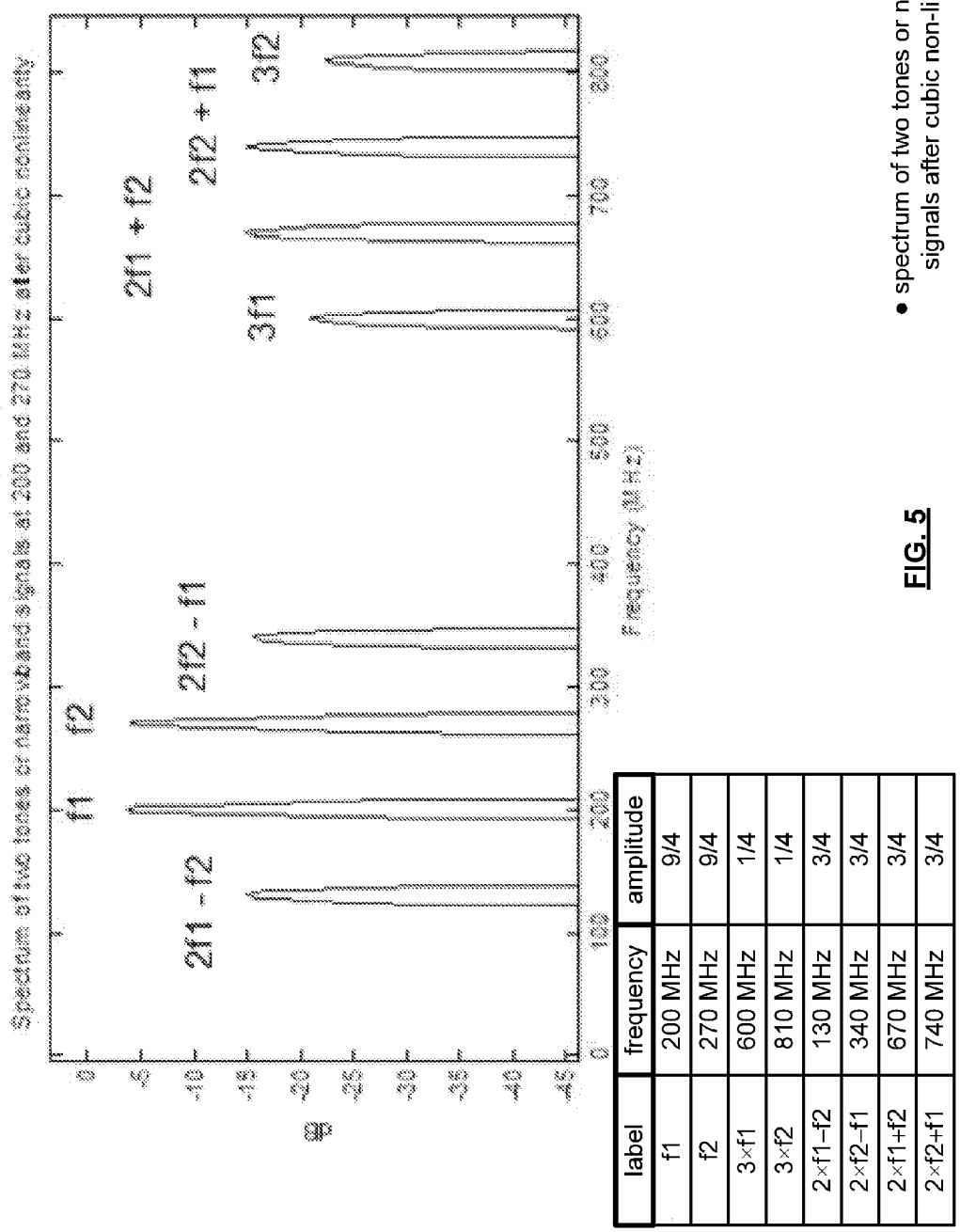
FIG. 5 illustrates an embodiment of spectrum of two tones of narrowband signals after cubic non-linearity.

FIG. 5 illustrates an embodiment 500 of spectrum of two tones of narrowband signals after cubic non-linearity. As may be seen with respect to this diagram, there are eight respective towns at the cubic non-linearity output as follows:

Frequency f1=200 MHz, amplitude 9/4
Frequency f2=270 MHz, amplitude 9/4
Frequency 3×f1=600 MHz, amplitude 1/4
Frequency 3×f2=810 MHz, amplitude 1/4
Frequency 2×f1−f2=130 MHz, amplitude 3/4
Frequency 2×f2−f1=340 MHz, amplitude 3/4
Frequency 2×f1+f2=670 MHz, amplitude 3/4
Frequency 2×f2+f1=740 MHz, amplitude 3/4

As can be seen, the two narrowband signals at the input (e.g., those associated with frequencies f1 and f2) produce eight respective signals of the output, at relatively well-defined levels.

In accordance with various aspects, and their equivalents, of the invention, the respective output signals may be analyzed to estimate the degree of non-linearity within the system. In a baseline approach, the signal at 2×f1−f2 or the signal at 2×f2−f1 may be used to estimate the degree of non-linearity within the system.

As also mentioned above, such a locally implemented communication device (e.g., cable modem) may be configured or operative to perform simultaneous capture of samples from multiple respective communication channels (e.g., communication channels A, B, and C, at frequencies f1, f2, and 2×f1−f2, respectively). Such operations as performed by a locally implemented communication device (e.g., cable modem) may be made in accordance with any of a number of desired digital signal processing operations. In one possible embodiment, such correlation processing (e.g., such as described above where respective samples associated with C may be compared with those samples associated with $A^2 \times B$) are employed to measure such intermodulation products (e.g., third order intermodulation products) falling onto communication channel C. Of course, it is noted that alternative digital signal processing operations may alternatively be performed in accordance with characterizing and making estimations of different respective intermodulation products.

Also, it is noted that while using tones, the intermodulation signal at 2×f1−f2 is also a tone. However, in the case of QAM signals, a convolution of frequency spectra will occur. For example, assuming the respective signals associated with communication channels A and B have communication spectra with approximately rectangular shape (e.g., with some degree of rolloff such as a certain percentage, say, 12%), then the intermodulation product (e.g., third order intermodulation product) falling onto communication channel C at 2×f1−f2 will generally have a spectral shape that is approximately parabolic. In addition, the spectral shape associated with the intermodulation product (e.g., third order intermodulation product) falling onto communication channel C will be some scaled version (e.g., approximately 3 in some instances) of the bandwidth of the original signals associated with communication channels A and B. The associated spectral spreading may be accounted for in accordance with such digital processing as described herein. That is to say, if only a portion (e.g., a partial band) of an intermodulation product lies under a given desired signal band (e.g., a given 6 MHz desired signal band), then appropriate digital signal processing (e.g., correlation processing as described above or other type of digital signal processing) may be tailored to use only that portion in the respective digital signal processing calculations.

Several of the following diagrams show the respective spreading of the spectral shape of a communication signal as caused by the non-linearity associated with such intermodulation products.

Figure 6:
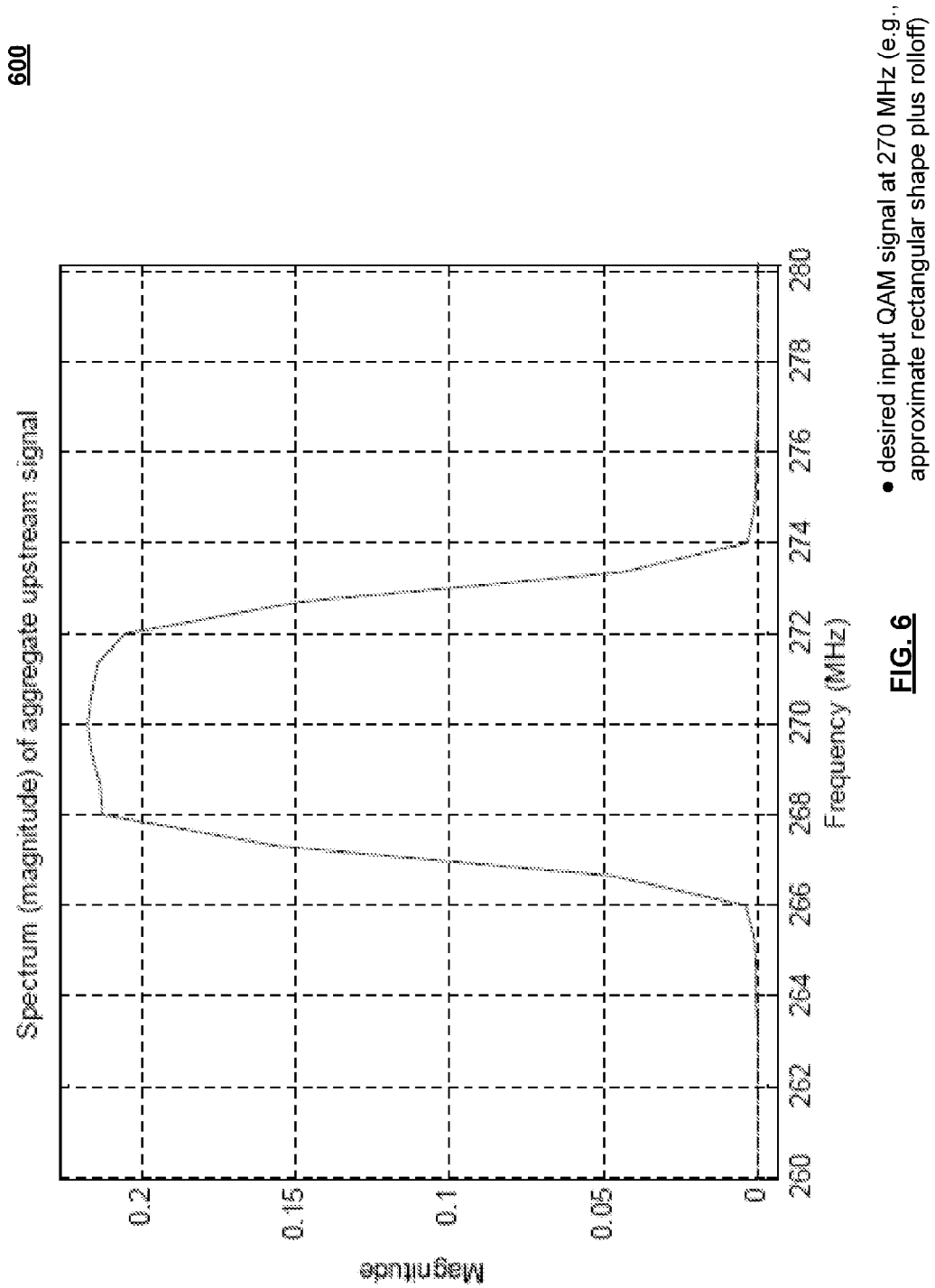
FIG. 6 illustrates an embodiment of desired input quadrature amplitude modulation (QAM) signal at 270 MHz (e.g., showing approximate rectangular shape plus rolloff).

FIG. 6 illustrates an embodiment 600 of desired input quadrature amplitude modulation (QAM) signal at 270 MHz (e.g., showing approximate rectangular shape plus rolloff).

Figure 7:
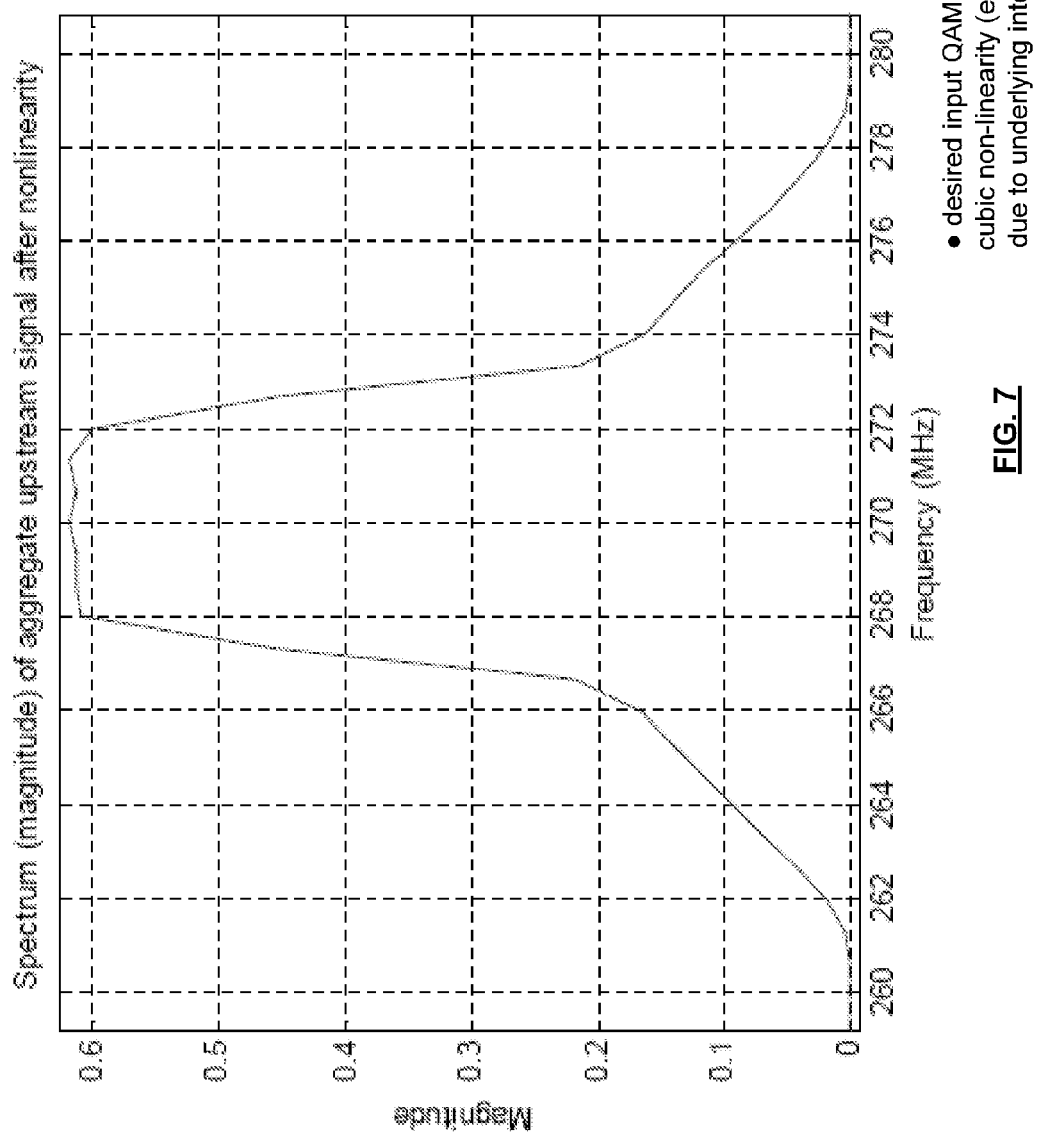
FIG. 7 illustrates an embodiment of desired input QAM signal at 270 MHz after cubic non-linearity (e.g., showing spreading at bottom due to underlying intermodulation products).

FIG. 7 illustrates an embodiment 700 of desired input QAM signal at 270 MHz after cubic non-linearity (e.g., showing spreading at bottom due to underlying intermodulation products).

Figure 8:
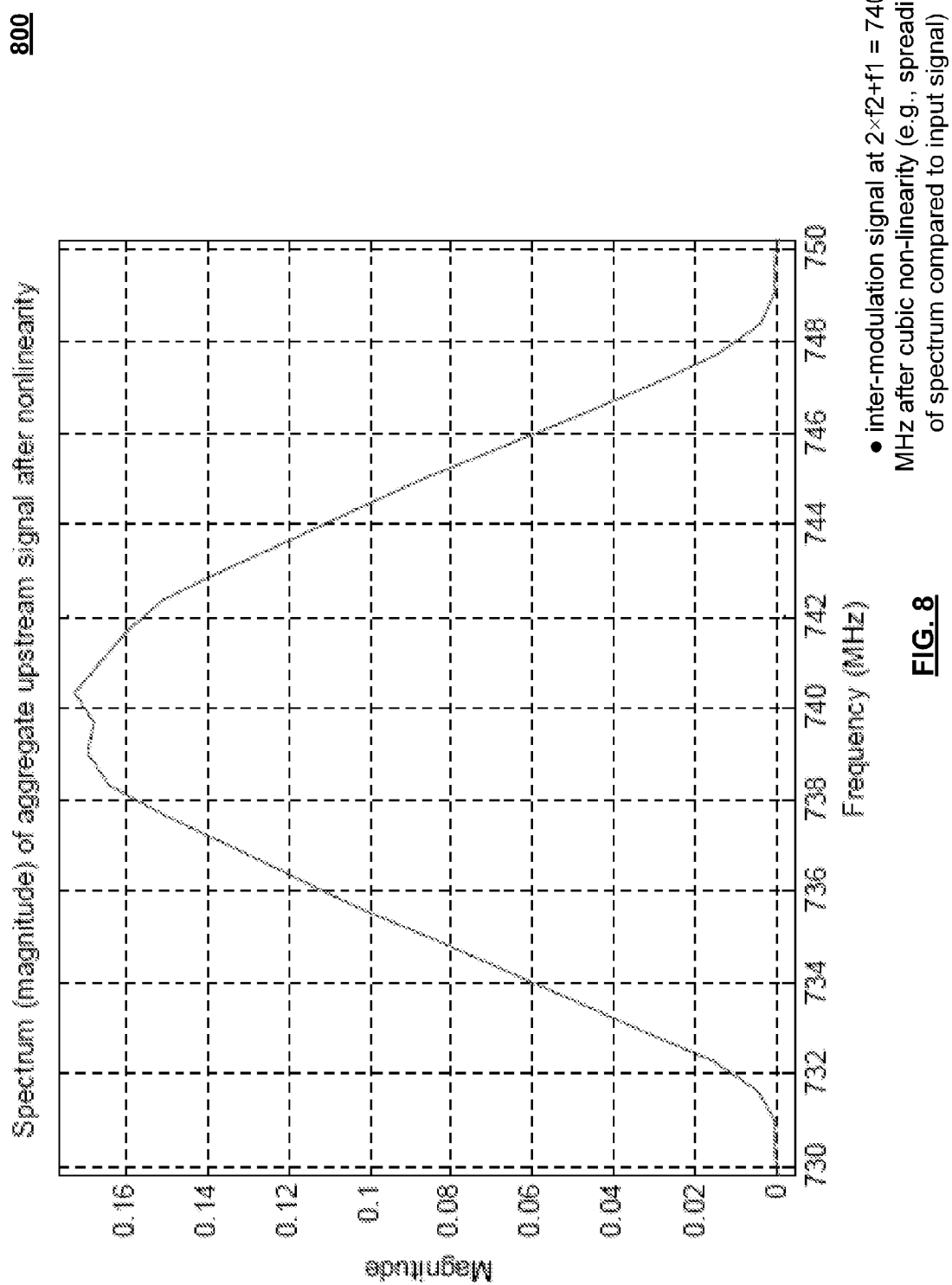
FIG. 8 illustrates an embodiment of an intermodulation signal at $2 \times f2 + f1 = 740$ MHz after cubic non-linearity (e.g., showing spreading of spectrum compared to input signal FIG. 9 illustrates an embodiment of an intermodulation signal at $2 \times f2 - f1 = 130$ MHz after cubic non-linearity (e.g., showing spreading of spectrum compared to input signal).
Figure 9:
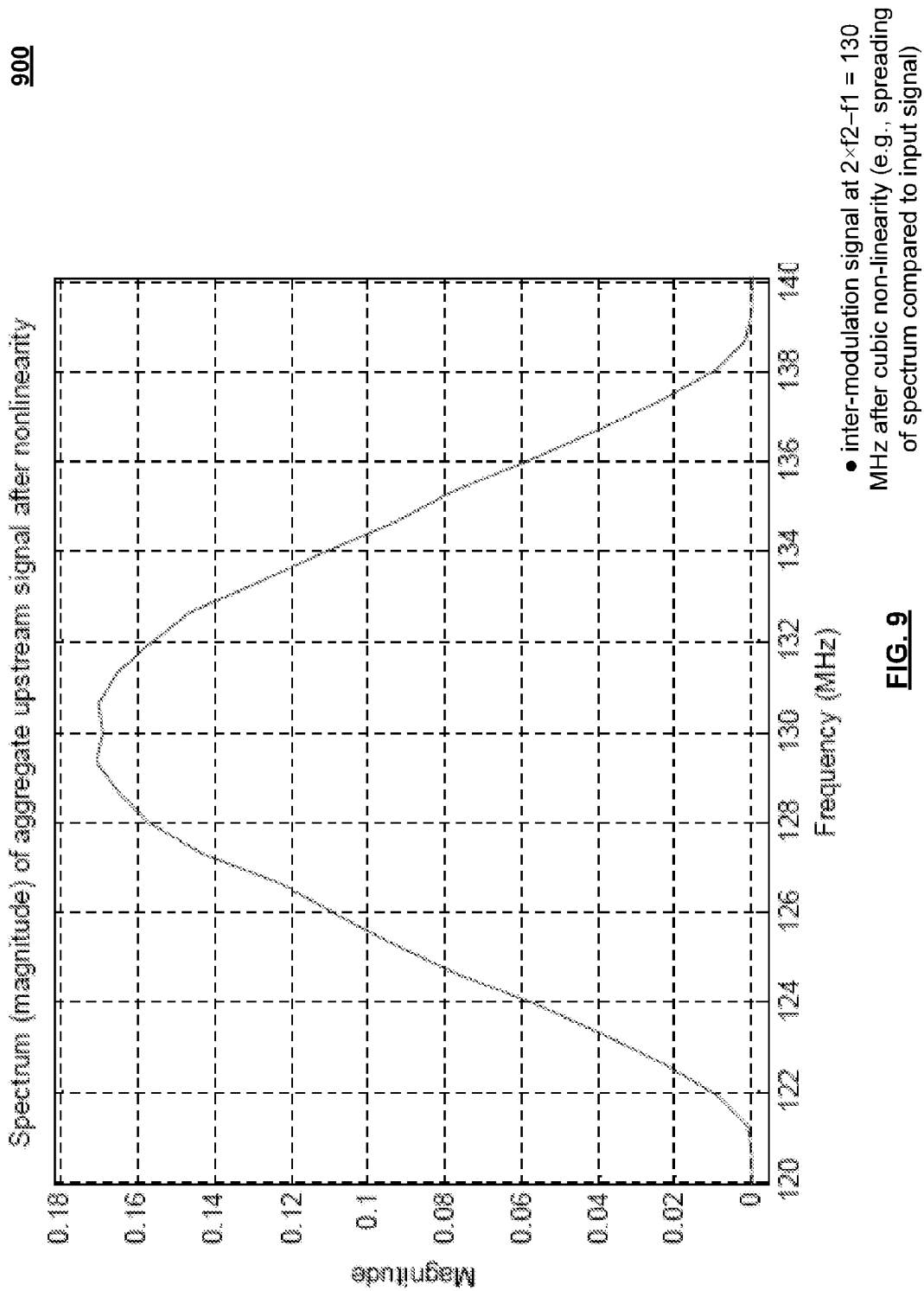

FIG. 8 illustrates an embodiment 800 of an intermodulation signal at 2×f2+f1=740 MHz after cubic non-linearity (e.g., showing spreading of spectrum compared to input signal FIG. 9 illustrates an embodiment 900 of an intermodulation signal at 2×f2−f1=130 MHz after cubic non-linearity (e.g., showing spreading of spectrum compared to input signal).

Figure 10:
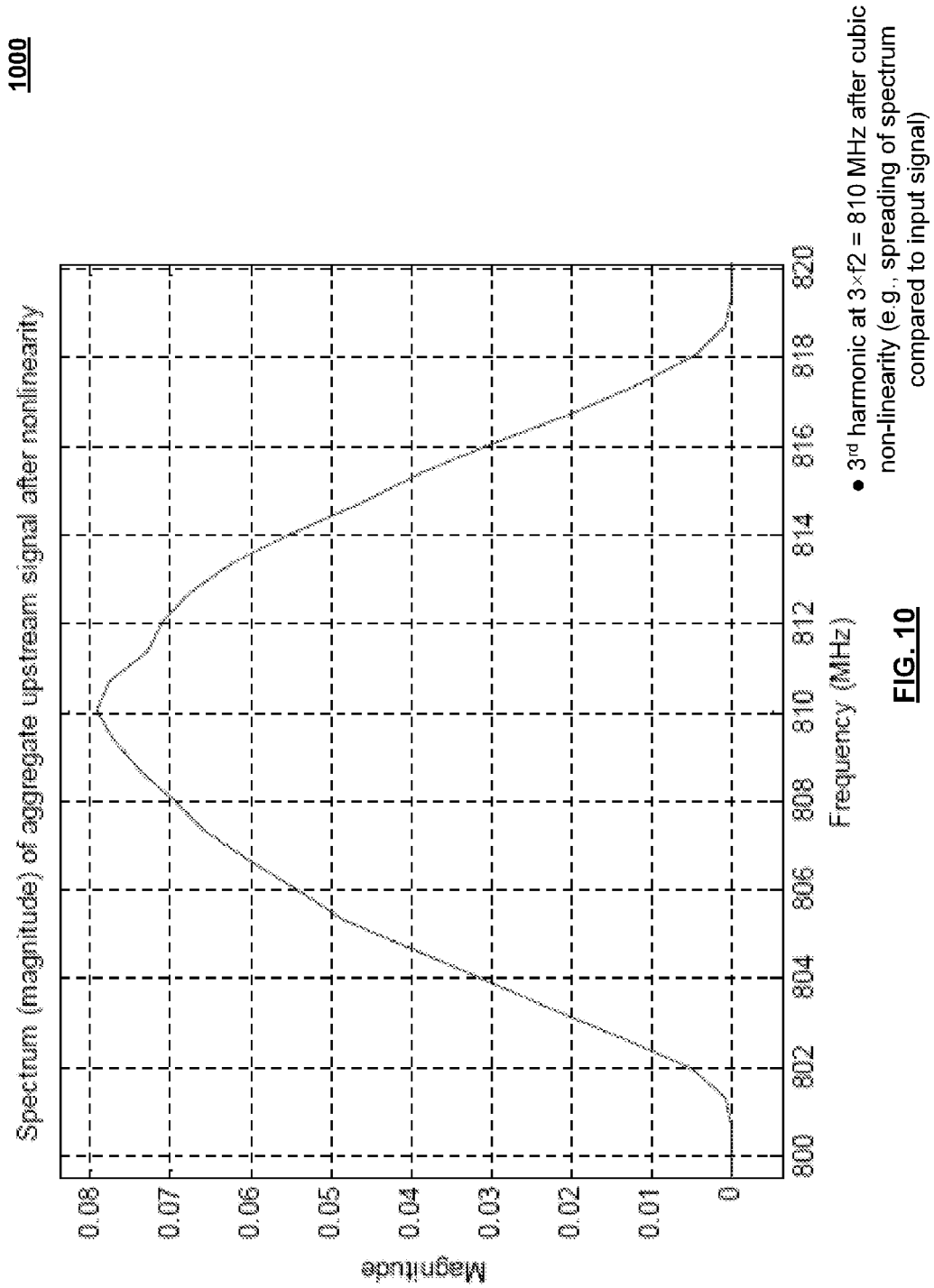
FIG. 10 illustrates an embodiment of an intermodulation signal, $3^{rd}$ harmonic, at $3 \times f2 = 810$ MHz after cubic non-linearity (e.g., showing spreading of spectrum compared to input signal).

FIG. 10 illustrates an embodiment 1000 of an intermodulation signal, $3^{rd}$ harmonic, at 3×f2=810 MHz after cubic non-linearity (e.g., showing spreading of spectrum compared to input signal).

Figure 11:
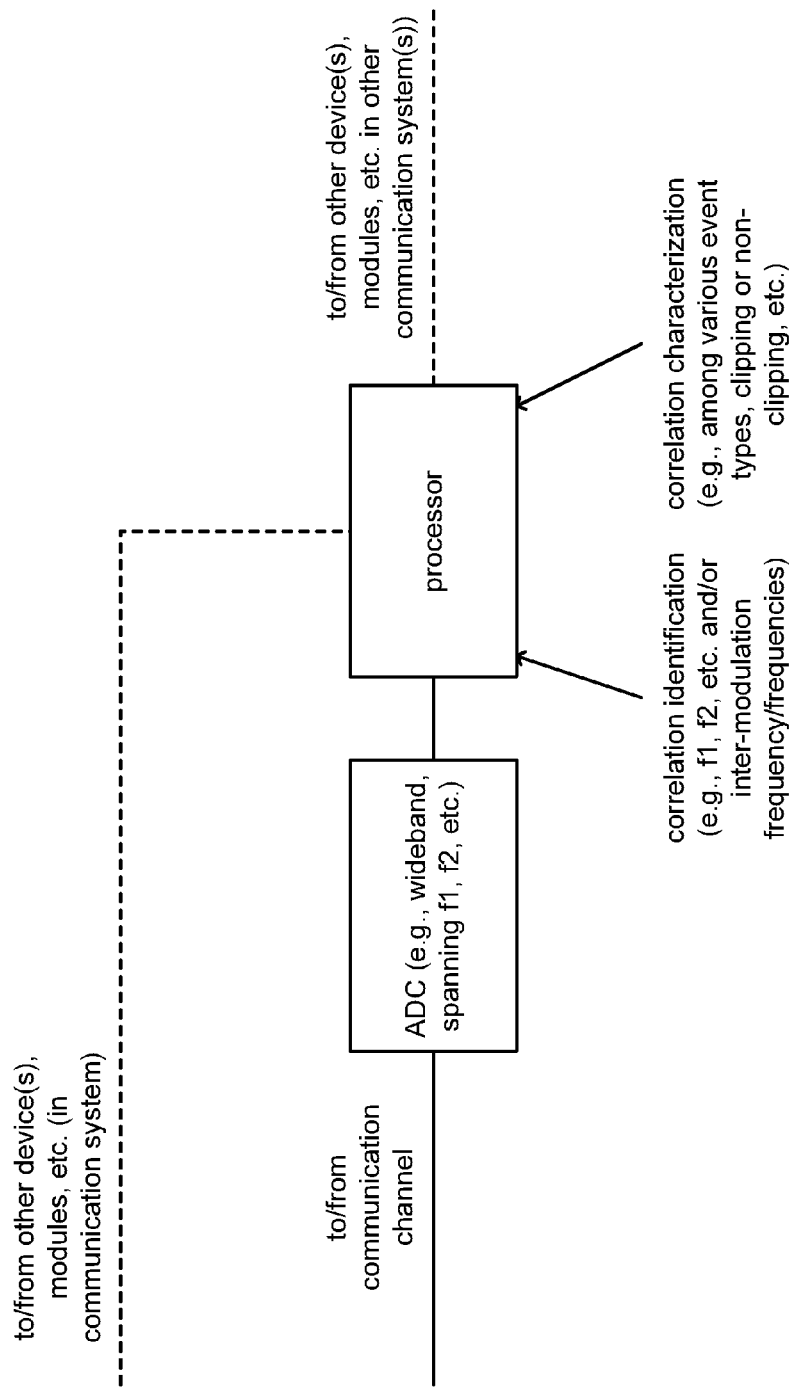
FIG. 11 illustrates an embodiment of a device to perform detection, identification, analysis, and/or diagnostics or one or more intermodulation products of digital signals in a communication system.

FIG. 11 illustrates an embodiment 1100 of a device to perform detection, identification, analysis, and/or diagnostics or one or more intermodulation products of digital signals in a communication system. As may be understood with respect to such a diagram, a device or communication device may be implemented to receive one or more signals from and provide one or more signals to one or more communication channels of one or more communication systems. An appropriately implemented analog to digital converter (ADC) may allow for capturing not only of a signal of interest, but of many other signals simultaneously. As described elsewhere herein, with respect to the systems operating in the digital age, various respective intermodulation products of signals may occur, including composite second order (CSO), composite triple beat (CTB), or even higher ordered intermodulation products of signals. As may be understood, within certain communication systems, analog signals therein may have relatively strong continuous wave tones. With respect to employing a wideband ADC, subsequent processing of the samples captured thereby can provide access to a much broader frequency range than may be provided by a prior art and/or frequency response limited ADC.

When operating such an appropriately implemented ADC, and by performing appropriate smoothing and/or averaging over and adequately long period of time, then determination can be made if other signals are perhaps being intermodulation in mixed in with any of those respective signals of interest within the system. Generally speaking, a signal of interest may be viewed as a signal intentionally injected into the communication system, whereas an undesirable intermodulation product signal may be viewed as a signal unintentionally injected into the communication system. However, it is also noted that there may be instances in which an undesirable intermodulation product signal may unfortunately have a common frequency of a signal of interest within the communication system. Appropriate identification and characterization of an intentional signal or signal of interest at a given frequency and an undesirable intermodulation product signal at the same frequency can be made using appropriate signal processing techniques.

As may also be understood, with respect to various modulation techniques employed within modern communication systems, including various higher-order modulation such as quadrature amplitude modulation (QAM) (of any desired degree including quadrature phase shift keying (QPSK), 16 quadrature amplitude modulation (QAM), 64 QAM, etc.), such signals may not be able to be appropriately seen on conventional spectrum analyzers or using conventional signal processing techniques. For example, such intermodulation product signals may be orders of magnitude further down (e.g., 10 dB, 20 dB, or more) with respect to a desired signal or signal of interest. However, appropriate signal processing of samples associated with an ADC having an adequately broad frequency response can allow for identification of any such intermodulation products signals (e.g., such as performing a cross-correlation with the desired signal or signal interest).

Generally speaking, appropriate processing of the samples provided from such an appropriately implemented ADC (e.g., a wideband ADC) can provide for diagnostic functionality to determine and/or track any number of conditions and/or characteristics of a communication system and/or the one or more communication devices, components, etc. therein. As may also be understood, certain effects within such a communication system may also vary over time. Appropriate tracking of such effects, given such time-varying characteristics, can provide for assessment on the relative changing health of any such elements within the communication system over time.

For example, one embodiment may operate to measure or identify any such intermodulation product signal(s) within a communication system. Another embodiment may operate not only to measure identify such effects, but also to track the relative nature of such effects. Even another embodiment may operate to identify where such effects are being caused by one or more elements within the system. For example, if the existence of such an effect is known within the system, then appropriate signal processing including adjustment thereof may be performed to deal with such an anomaly. Alternatively, if the relative magnitude of the effect is sufficiently far down (e.g., such as being sufficiently small with respect to other signals in the system, or relatively with respect to comparison to one or more measurands or thresholds), then such an effect may be deemed relatively non-harmful and perhaps may be ignored. Any of a number of respective processing actions or non-actions may be selectively performed based upon the appropriate identification of such intermodulation products signals as well as the characterization of such intermodulation products signals as corresponding to any one or more types of effects or events.

As may be understood with respect to other embodiments and/or diagrams herein, it is also noted that selective operation may be performed based upon the characterization of one or more events as determined by the identification of one or more intermodulation products signals within the system. For example, based upon a first event being identified, a first processing operation may be performed on at least some of the samples generated by such an ADC. Alternatively, based upon a second event being identified, a second up processing operation may be performed on the at least some of the samples generated by the ADC. As may be understood, any number of respective events may be characterized, and any number of processing operations may correspondingly be performed based thereon. As may also be understood, certain processing operations may be performed as a function of more than one respective event being characterized. For example, if two or more respective events are characterized, then a different respective processing operation may be performed then if any one of those particular respective events is individually characterized. That is to say, different respective processing may be performed based upon any one or more individual events being characterized or any combination of events being characterized.

For example, such selective processing may be performed using an adaptive equalizer in one embodiment. If one event is characterized, then operation of such an adaptive equalizer may be performed using a first set of coefficients for the taps of such an adaptive equalizer. Alternatively, if another event is characterized, the operation of such an adaptive equalizer may be performed using a second set of coefficients for the taps of such an adaptive equalizer. As may be understood, any desired number of taps, any desired number of sets of coefficients, etc. may be performed and employed selectively as a function of various events being characterized. Generally speaking, the operation of any one or more respective components, modules, functional blocks, etc. within any one or more devices within such a communication system may operate adaptively and selectively as a function of various advanced being characterized.

With respect to this diagram, such an apparatus or device may be viewed as including an analog to digital converter (ADC) to capture samples of a first signal (e.g., having a first frequency, f1) and at least one additional signal (e.g., having a second frequency, f2 if only one additional signal, or each of a number of other respective signals having a number of other respective frequencies, such as f2, f3, etc.). Such an ADC may be implemented such that the ADC has a wideband frequency response spanning at least the first frequency and the at least one additional frequency and at least one intermodulation product corresponding to at least one of the first frequency and the at least one additional frequency. That is to say, such an ADC has an appropriately wideband frequency response such that a very wide bandwidth of signaling may be sampled thereby.

In addition, such an apparatus or device may include one or more processors identify a correlation between the at least the first frequency and the at least one additional frequency and the at least one intermodulation product corresponding to the first frequency and the at least one additional frequency. Then, based on identification of the correlation, the one or more processors can then operate to characterize the correlation as corresponding to at least one of a plurality of events affecting a communication system in which the apparatus or device is operative.

FIG. 12, FIG. 13, FIG. 14, and FIG. 15 illustrate various embodiments of methods for operating one or more communication devices.

Figure 12:
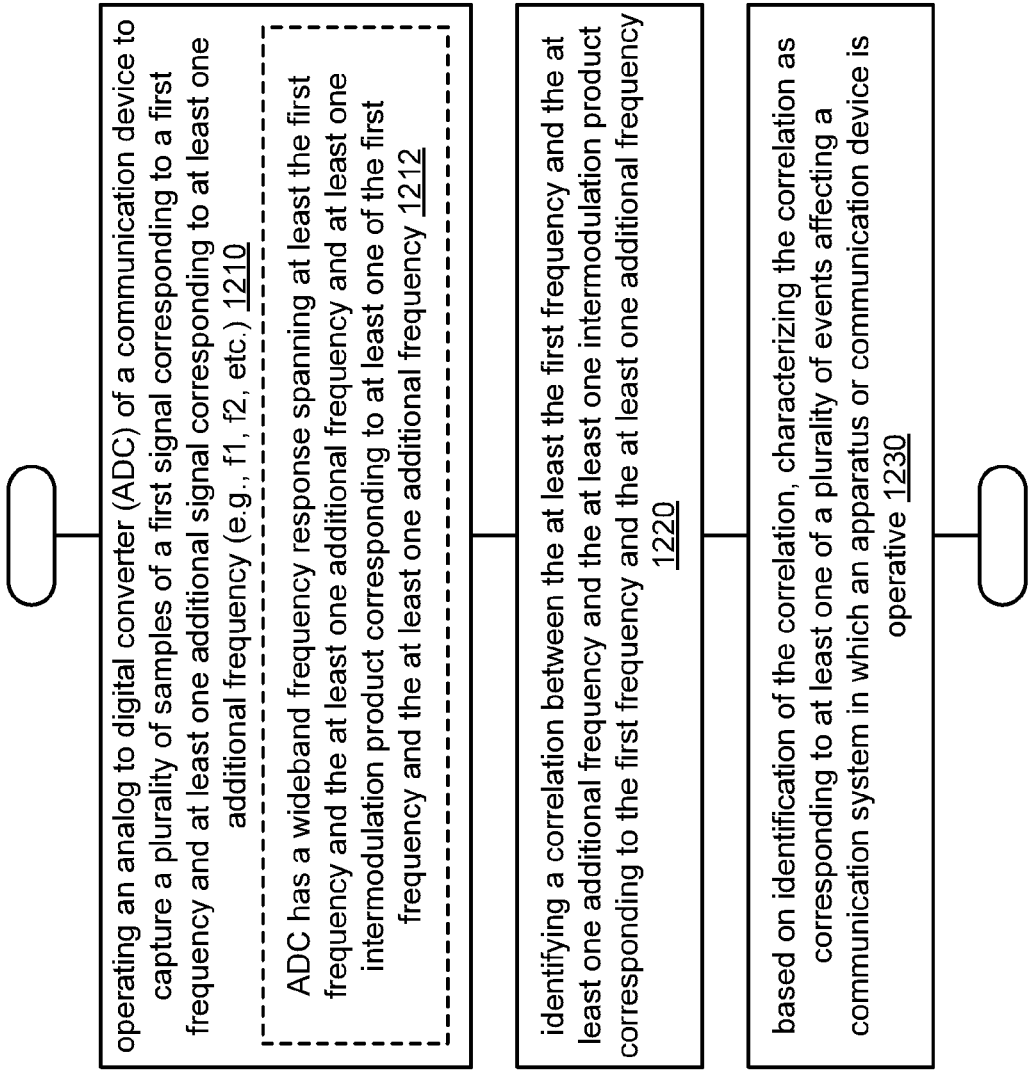
FIG. 12, FIG. 13, FIG. 14, and FIG. 15 illustrate various embodiments of methods for operating one or more communication devices.

Referring to method 1200 of FIG. 12, the method 1200 begins by operating an analog to digital converter (ADC) of a communication device to capture a plurality of samples of a first signal corresponding to a first frequency and at least one additional signal corresponding to at least one additional frequency (e.g., f1, f2, etc.), as shown in a block 1210. In some embodiments, the ADC has a wideband frequency response spanning at least the first frequency and the at least one additional frequency and at least one intermodulation product corresponding to at least one of the first frequency and the at least one additional frequency, as shown in a block 1212.

The method 1200 continues by identifying a correlation between the at least the first frequency and the at least one additional frequency and the at least one intermodulation product corresponding to the first frequency and the at least one additional frequency, as shown in a block 1220.

Based on identification of the correlation, the method 1200 then operates by characterizing the correlation as corresponding to at least one of a plurality of events affecting a communication system in which the apparatus or communication device is operative, as shown in a block 1230.

Figure 13:
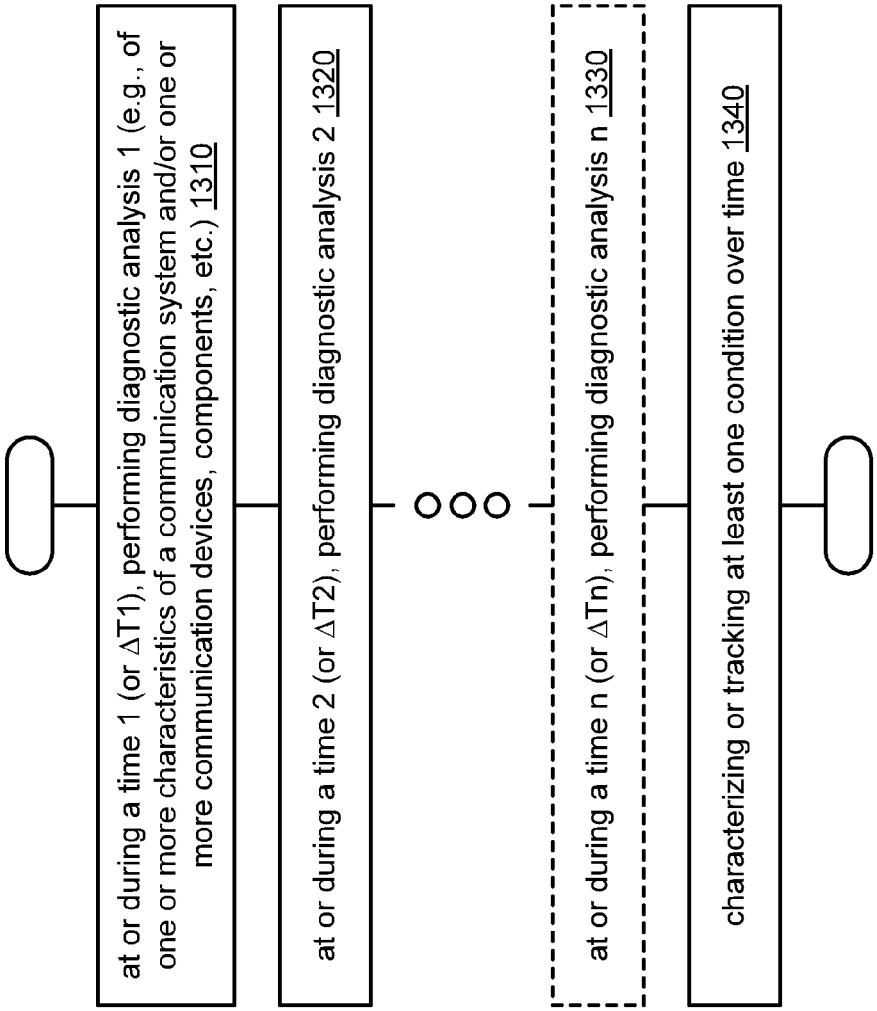

Referring to method 1300 of FIG. 13, the method 1300 begins by at or during a time 1 (or time period, ΔT1), performing diagnostic analysis 1 (e.g., of one or more characteristics of a communication system and/or one or more communication devices, components, etc.), as shown in a block 1310.

At or during a time 2 (or time period, ΔT2), the method 1300 then continues by performing diagnostic analysis 2 (e.g., of the one or more characteristics of the communication system and/or the one or more communication devices, components, etc.), as shown in a block 1320. The method 1300 continues to perform such diagnostic analyses any desired number of successive times or time periods. For example, at or during a time n (or time period, ΔTn), the method 1300 then operates by performing diagnostic analysis n (e.g., of the one or more characteristics of the communication system and/or the one or more communication devices, components, etc.), as shown in a block 1330.

The method 1300 continues by characterizing or tracking at least one condition (e.g., of the one or more characteristics of the communication system and/or the one or more communication devices, components, etc.) over time, as shown in a block 1340. As may be understood, such a method 1300 may operate by performing a number of diagnostic analyses, respectively at a plurality of successive times, on such a communication system (and/or any element therein) in which an apparatus, device, or communication device is operative to characterize or track condition of the communication system (and/or any element therein) over time.

Figure 14:
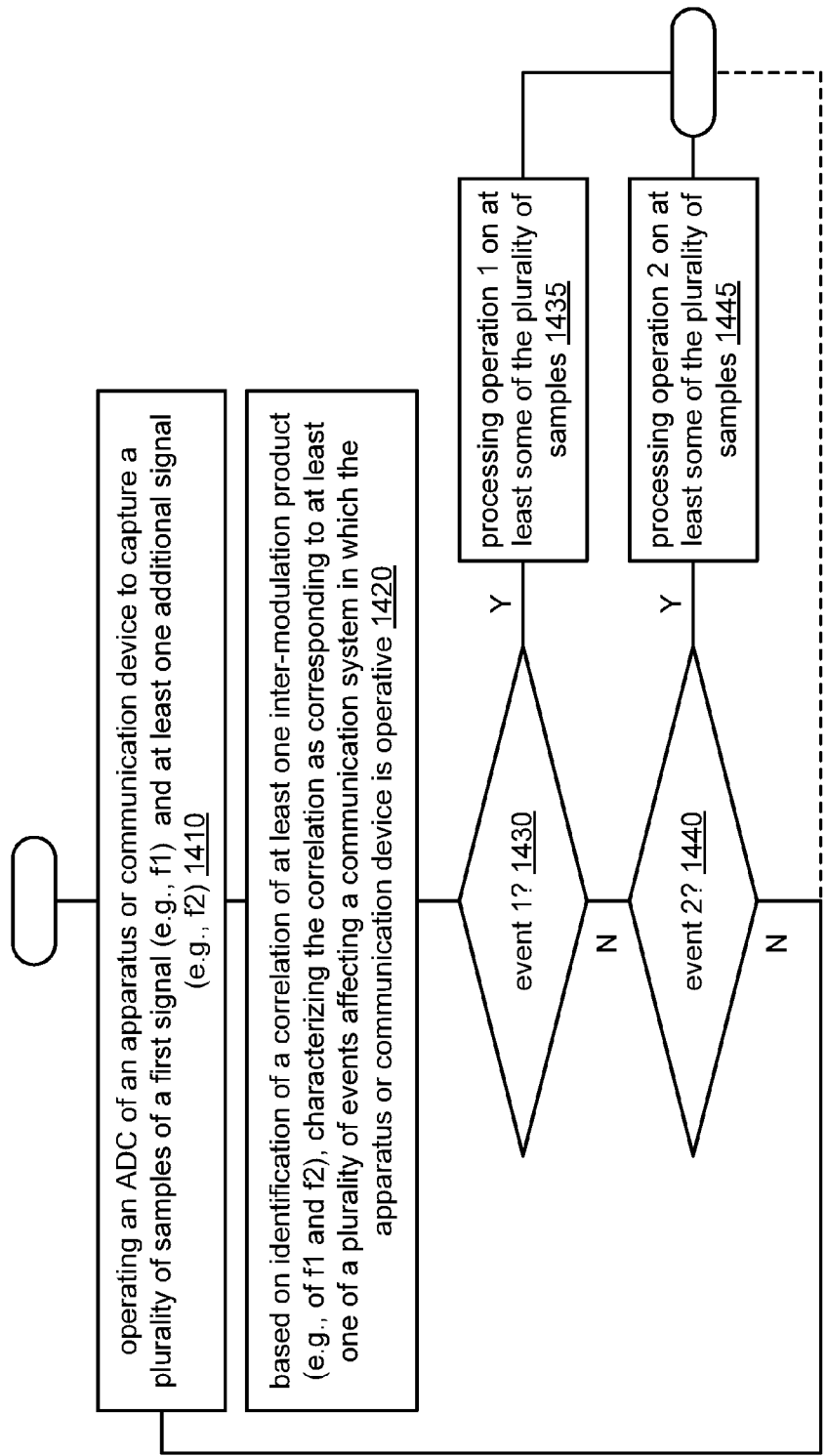

Referring to method 1400 of FIG. 14, the method 1400 begins by operating an ADC of an apparatus or communication device to capture a plurality of samples of a first signal (e.g., f1) and at least one additional signal (e.g., f2), as shown in a block 1410.

Based on identification of a correlation of at least one intermodulation product (e.g., of f1 and f2), the method 1400 continues by characterizing the correlation as corresponding to at least one of a plurality of events affecting a communication system in which the apparatus or communication device is operative, as shown in a block 1420.

If an event 1 is identified in accordance with such characterization, as shown in a decision block 1430, the method 1400 then operates by performing processing operation 1 on at least some of the plurality of samples, as shown in a block 1430.

Alternatively, if an event 2 is identified in accordance with such characterization, as shown in a decision block 1440, the method 1400 then operates by performing processing operation 2 on at least some of the plurality of samples, as shown in a block 1440.

Figure 15:
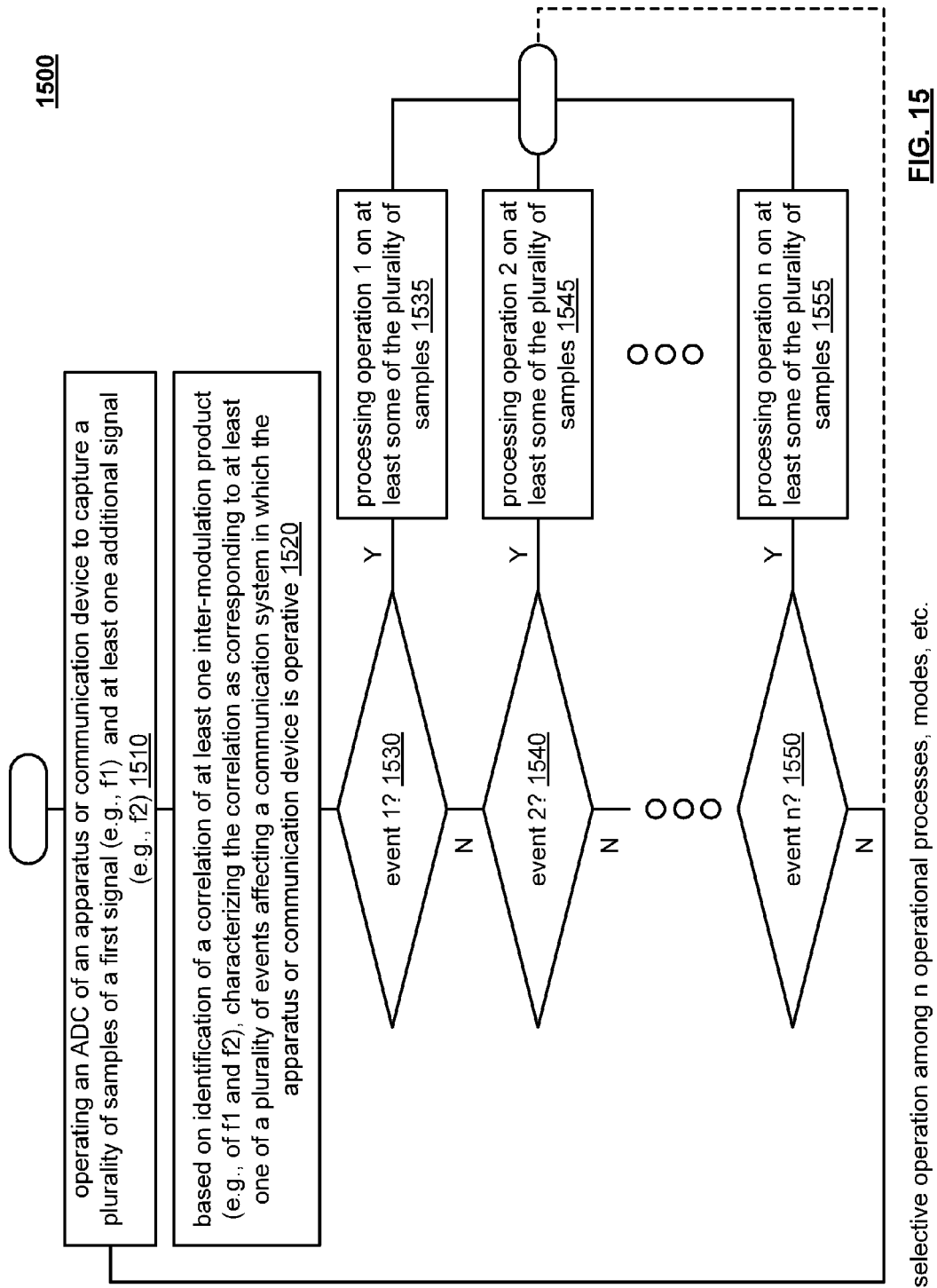

Referring to method 1500 of FIG. 15, the method 1500 begins by operating an ADC of an apparatus or communication device to capture a plurality of samples of a first signal (e.g., f1) and at least one additional signal (e.g., f2), as shown in a block 1510.

Based on identification of a correlation of at least one intermodulation product (e.g., of f1 and f2), The method 1500 continues by characterizing the correlation as corresponding to at least one of a plurality of events affecting a communication system in which the apparatus or communication device is operative, as shown in a block 1520.

If an event 1 is identified in accordance with such characterization, as shown in a decision block 1530, the method 1500 then operates by performing processing operation 1 on at least some of the plurality of samples, as shown in a block 1535.

Alternatively, if an event 2 is identified in accordance with such characterization, as shown in a decision block 1540, the method 1500 then operates by performing processing operation 2 on at least some of the plurality of samples, as shown in a block 1545.

The method 1400 continues to perform such operations to perform such characterization of various events. For example, if an event n is identified in accordance with such characterization, as shown in a decision block 1550, the method 1500 then operates by performing processing operation n on at least some of the plurality of samples, as shown in a block 1555.

It is also noted that the various operations and functions as described with respect to various methods herein may be performed within any of a number of types of communication devices, such as using a baseband processing module and/or a processing module implemented therein, and/or other components therein. For example, such a baseband processing module and/or processing module can generate such signals and perform such operations, processes, etc. as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing, operations, etc. in accordance with various aspects of the invention, and/or any other operations and functions as described herein, etc. or their respective equivalents. In some embodiments, such processing is performed cooperatively by a first processing module in a first device, and a second processing module within a second device. In other embodiments, such processing, operations, etc. are performed wholly by a baseband processing module and/or a processing module within one given device. In even other embodiments, such processing, operations, etc. are performed using at least a first processing module and a second processing module within a singular device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction with software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus comprising:
an analog to digital converter (ADC) configured to capture a plurality of samples of a first signal corresponding to a first frequency and at least one additional signal corresponding to at least one additional frequency, wherein the ADC having a wideband frequency response spanning at least the first frequency and the at least one additional frequency and at least one intermodulation product corresponding to at least one of the first frequency or the at least one additional frequency;

a processor that is coupled to the ADC and configured to:
  identify a correlation between the at least the first frequency and the at least one additional frequency and the at least one intermodulation product corresponding to at least one of the first frequency or the at least one additional frequency; and
  characterize, based on identification of the correlation, the correlation as corresponding to at least one of a plurality of events, including at least one clipping event and at least one non-clipping event, affecting a communication system in which the apparatus is operative;
the processor or at least one additional processor configured to:
  perform, based on characterization of the correlation as corresponding to a first of the plurality of events, a first processing operation on at least some of the plurality of samples; and
  perform, based on the characterization of the correlation as corresponding to a second of the plurality of events, a second processing operation on the at least some of the plurality of samples.

2. The apparatus of claim 1 further comprising:
an adaptive equalizer configured to:
  process the plurality of samples;
  process, based on characterization of the correlation as corresponding to the first of the plurality of events, the plurality of samples using a first plurality of equalizer coefficient tap values; and
  process, based on characterization of the correlation as corresponding to the second of the plurality of events, the plurality of samples using a second plurality of equalizer coefficient tap values.

3. The apparatus of claim 1, wherein:
the at least one additional signal corresponding to the at least one additional frequency is a second signal corresponding to a second frequency;
the ADC configured to capture the plurality of samples of the first signal corresponding to the first frequency, the second signal corresponding to the second frequency, and a third signal corresponding to a third frequency; and
the at least one intermodulation product corresponding to the first frequency, the second frequency, or the third frequency.

4. The apparatus of claim 1 further comprising:
the processor or at least one additional processor configured to perform a plurality of diagnostic analyses, respectively at a plurality of successive times, on the communication system in which the apparatus is operative to characterize or track condition of the communication system over time.

5. The apparatus of claim 1 further comprising:
a communication device that is operative within at least one of a satellite communication system, a wireless communication system, a wired communication system, a fiber-optic communication system, or a mobile communication system.

6. An apparatus comprising:
an analog to digital converter (ADC) configured to capture a plurality of samples of a first signal corresponding to a first frequency and at least one additional signal corresponding to at least one additional frequency, wherein the ADC having a wideband frequency response spanning at least the first frequency and the at least one additional frequency and at least one intermodulation product corresponding to at least one of the first frequency or the at least one additional frequency; and
a processor that is coupled to the ADC and configured to:
  process the plurality of samples to identify the first frequency of the first signal;
  process the plurality of samples to identify the at least one additional frequency of the at least one additional signal;
  identify a correlation between the at least the first frequency and the at least one additional frequency and the at least one intermodulation product corresponding to at least one of the first frequency or the at least one additional frequency; and
  characterize, based on identification of the correlation, the correlation as corresponding to at least one of a plurality of events affecting a communication system in which the apparatus is operative.

7. The apparatus of claim 6 further comprising:
the processor or at least one additional processor configured to perform, based on characterization of the correlation as corresponding to a first of the plurality of events, a first processing operation on at least some of the plurality of samples; and
the processor or at least one additional processor configured to perform, based on the characterization of the correlation as corresponding to a second of the plurality of events, a second processing operation on the at least some of the plurality of samples.

8. The apparatus of claim 6 further comprising:
an adaptive equalizer configured to:
  process the plurality of samples;
  process, based on characterization of the correlation as corresponding to a first of the plurality of events, the plurality of samples using a first plurality of equalizer coefficient tap values; and
  process, based on characterization of the correlation as corresponding to a second of the plurality of events, the plurality of samples using a second plurality of equalizer coefficient tap values.

9. The apparatus of claim 6, wherein the plurality of events including at least one clipping event and at least one non-clipping event.

10. The apparatus of claim 6, wherein:
the at least one additional signal corresponding to the at least one additional frequency is a second signal corresponding to a second frequency;
the ADC configured to capture the plurality of samples of the first signal corresponding to the first frequency, the second signal corresponding to the second frequency, and a third signal corresponding to a third frequency; and
the at least one intermodulation product corresponding to the first frequency, the second frequency, or the third frequency.

11. The apparatus of claim 6, wherein the at least one intermodulation product corresponding to the first frequency and the at least one additional frequency including a first intermodulation product corresponding to a first linear combination of the at least one of the first frequency or the at least one additional frequency and a second intermodulation product corresponding to a second linear combination of the at least one of the first frequency or the at least one additional frequency.

12. The apparatus of claim 6 further comprising:
the processor or at least one additional processor configured to perform a plurality of diagnostic analyses, respectively at a plurality of successive times, on the communication system in which the apparatus is operative to characterize or track condition of the communication system over time.

13. The apparatus of claim 6 further comprising:
a communication device that is operative within at least one of a satellite communication system, a wireless communication system, a wired communication system, a fiber-optic communication system, or a mobile communication system.

14. A method for execution by a communication device, the method comprising:
operating an analog to digital converter (ADC) of the communication device to capture a plurality of samples of a first signal corresponding to a first frequency and at least one additional signal corresponding to at least one additional frequency, wherein the ADC having a wideband frequency response spanning at least the first frequency and the at least one additional frequency and at least one intermodulation product corresponding to at least one of the first frequency or the at least one additional frequency; and
processing the plurality of samples to identify the first frequency of the first signal;
processing the plurality of samples to identify the at least one additional frequency of the at least one additional signal;
identifying a correlation between the at least the first frequency and the at least one additional frequency and the at least one intermodulation product corresponding to at least one of the first frequency or the at least one additional frequency; and
characterizing, based on identification of the correlation, the correlation as corresponding to at least one of a plurality of events affecting a communication system in which the communication device is operative.

15. The method of claim 14 further comprising:
performing, based on characterization of the correlation as corresponding to a first of the plurality of events, a first processing operation on at least some of the plurality of samples; and
performing, based on the characterization of the correlation as corresponding to a second of the plurality of events, a second processing operation on the at least some of the plurality of samples.

16. The method of claim 14 further comprising:
operating an adaptive equalizer to process, based on characterization of the correlation as corresponding to a first of the plurality of events, the plurality of samples using a first plurality of equalizer coefficient tap values; and
operating the adaptive equalizer to process, based on characterization of the correlation as corresponding to a second of the plurality of events, the plurality of samples using a second plurality of equalizer coefficient tap values.

17. The method of claim 14, wherein the plurality of events including at least one clipping event and at least one non-clipping event.

18. The method of claim 14, wherein:
the at least one additional signal corresponding to the at least one additional frequency is a second signal corresponding to a second frequency; and further comprising:
operating the ADC to capture the plurality of samples of the first signal corresponding to the first frequency, the second signal corresponding to the second frequency, and a third signal corresponding to a third frequency; and wherein:
the at least one intermodulation product corresponding to the first frequency, the second frequency, or the third frequency.

19. The method of claim 14 further comprising:
performing a plurality of diagnostic analyses, respectively at a plurality of successive times, on the communication system in which the communication device is operative to characterize or track condition of the communication system over time.

20. The method of claim 14, wherein the communication device is operative within at least one of a satellite communication system, a wireless communication system, a wired communication system, a fiber-optic communication system, or a mobile communication system.

* * * * *